United States Patent
Schneuing

(10) Patent No.: US 6,609,608 B2
(45) Date of Patent: Aug. 26, 2003

(54) DRAG CATCH CONVEYOR

(75) Inventor: Ralf Schneuing, Steinhagen (DE)

(73) Assignee: PEP Fördertechnik GmbH, Bielefeld (DE)

(*) Notice: Subject to any disclaimer, the term of this patent is extended or adjusted under 35 U.S.C. 154(b) by 0 days.

(21) Appl. No.: 10/188,291

(22) Filed: Jul. 2, 2002

(65) Prior Publication Data

US 2003/0006123 A1 Jan. 9, 2003

(30) Foreign Application Priority Data

Jul. 4, 2001 (DE) .................................. 201 10 857 U

(51) Int. Cl.[7] ................................ B65G 29/00
(52) U.S. Cl. ................. 198/465.4; 198/732; 198/687.1; 104/172.1
(58) Field of Search .................. 198/465.4, 732, 198/733, 687.1; 104/172.1, 172.2, 172.4

(56) References Cited

U.S. PATENT DOCUMENTS

| | | | | |
|---|---|---|---|---|
| 2,573,334 A | * | 10/1951 | Hitz ........................ 198/687.1 |
| 2,816,643 A | * | 12/1957 | Klamp ..................... 198/465.4 |
| 3,557,935 A | * | 1/1971 | Gerisch ...................... 198/352 |
| 4,909,373 A | * | 3/1990 | Geerts .................. 198/370.05 |
| 5,072,822 A | * | 12/1991 | Smith ........................ 198/349 |
| 5,456,346 A | * | 10/1995 | Schilling et al. ............ 198/685 |
| 5,657,851 A | * | 8/1997 | Speckhart et al. ........ 198/465.4 |
| 5,806,657 A | * | 9/1998 | Enderlein et al. ........... 198/680 |
| 5,819,906 A | * | 10/1998 | Enderlein et al. ......... 198/687.1 |
| 6,199,682 B1 | * | 3/2001 | Matkovich ............... 198/465.4 |
| 6,206,178 B1 | * | 3/2001 | Jacobson .................... 198/680 |
| 6,382,396 B1 | * | 5/2002 | Dana et al. .............. 198/465.4 |
| 6,460,685 B1 | * | 10/2002 | Johansson et al. ....... 198/465.4 |

FOREIGN PATENT DOCUMENTS

DE          29809909          11/1998

* cited by examiner

Primary Examiner—Christopher P. Ellis
Assistant Examiner—Richard Ridles
(74) Attorney, Agent, or Firm—Richard M. Goldberg

(57) ABSTRACT

A drag catch conveyor including an endless, driven pulling chain which can be moved along a specified path, supporting blocks mounted to the pulling chain, a number of drag catches mounted to the pulling chain in mutually overlapping relation so as to be alternatively offset in a left direction and a right direction, and a rail system disposed below the path.

4 Claims, 2 Drawing Sheets

DRAG CATCH CONVEYOR

BACKGROUND OF THE INVENTION

The invention relates to a drag catch conveyor with an endless, driven pulling organ, which can be moved along a specified path and at which a number of drag catches are fastened, as well as to a rail system, which is disposed below the path.

Drag catch conveyors are known in various embodiments. As a rule, they comprise a rail system, a guiding mechanism for a pulling organ, such as an endless chain, disposed above the rails of the rail system, and a larger number of drag catches, pivotally mounted at the pulling organ. The drag catches take hold of objects, which are to be transported along the rails of the rail system. Such conveyors are frequently used for transporting articles of clothing on hangers with the help of the drag catches along the rails of the rail system.

Drag catches are attached to a supporting block generally so that they can be swivelled about a horizontal axis. In turn, the supporting block is mounted on the pulling organ. They extend from the supporting block to the rear, that is, counter to the transporting direction so that, with their hooks, they can take hold of or, by swiveling upward suitably, release objects on the rails.

So that the transported objects are pulled flat over the rails and not lifted up away from these, the drag catches need to have a certain length. This means that the distance between the drag caches at the pulling organ is sufficiently large and the number of drag catches, mounted on a pulling organ, is relatively small.

SUMMARY OF THE INVENTION

It is an object of the invention to create a drag catch conveyor of the above type, which makes a particularly tight sequence of the drag catches at the pulling organ possible.

Pursuant to invention, this objective is accomplished owing to the fact that the drag catches are mounted in a mutually overlapping manner at the pulling organ.

Preferably, the drag catches are disposed alternately offset to the right and to the left in relation to the conveying direction.

However, the drag catches can also be nested into each other in a different way, for example, in herringbone fashion.

BRIEF DESCRIPTION OF THE DRAWINGS

Preferred examples of the invention are explained in greater detail in the following by means of the enclosed drawing, in which.

DETAILED DESCRIPTION

Figure 1:
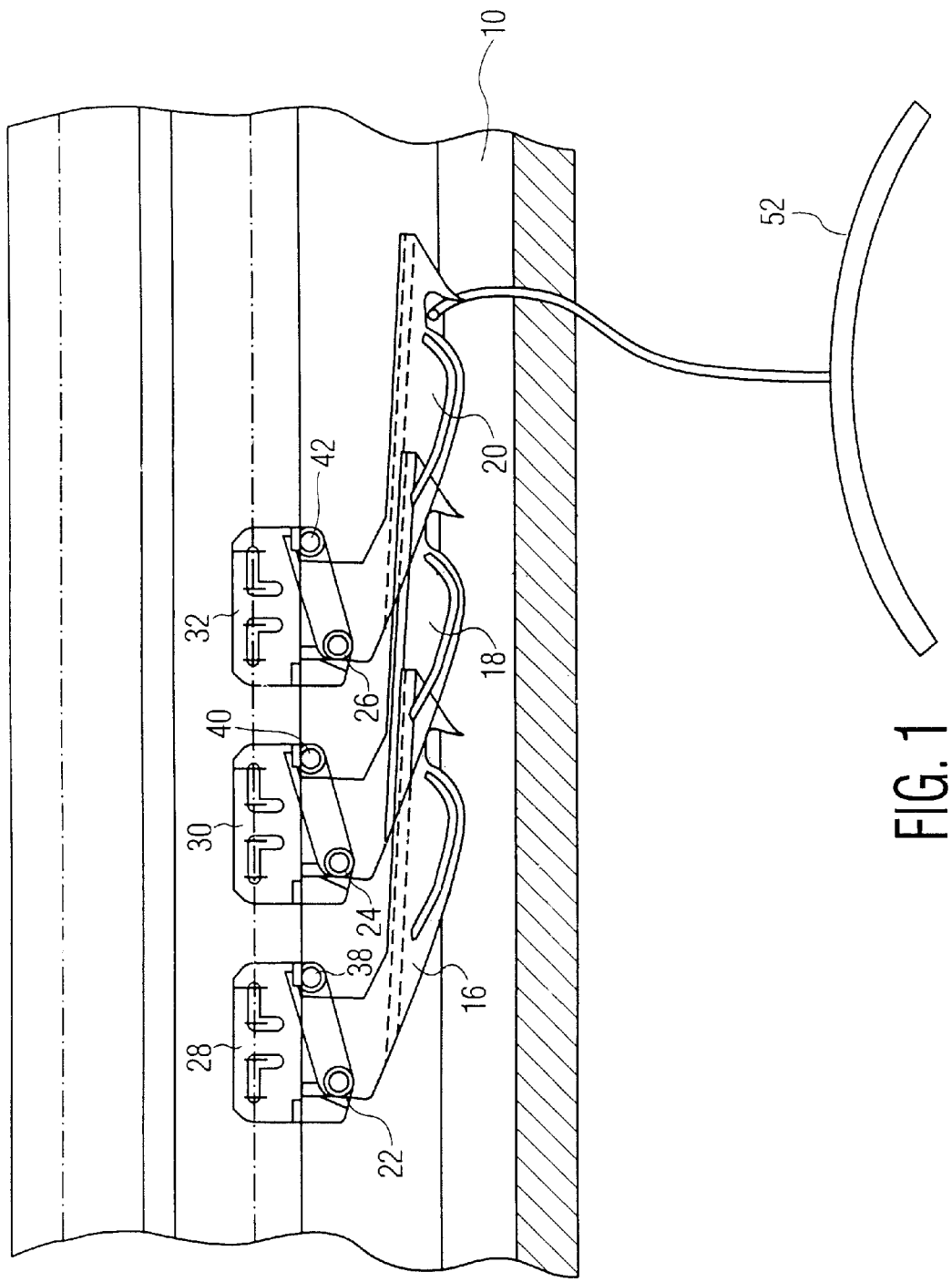
FIG. 1 shows a partially sectional side view of a section of the rail system of an inventive drag catch conveyor.

A drag catch conveyor of the present invention is based, for example, on a rail system, which is present, for example, in a factory building or a storage shed and, in the lower region, has a rail 10, on which the objects slide, which are to be transported but are not shown, such as clothes hangers 52 with articles of clothing. In the upper region, there is a guiding mechanism 12, in which an endless, driven, pulling organ, usually a chain 50, runs. In the example shown, the guiding mechanism 12 is constructed in mirror image fashion with respect to a horizontal plane 14, so that the selected pulling organ or chain 50 can run back in the upper region. In cross section, the guiding mechanism, as a whole, is constructed H-shaped in this manner.

Figure 2:
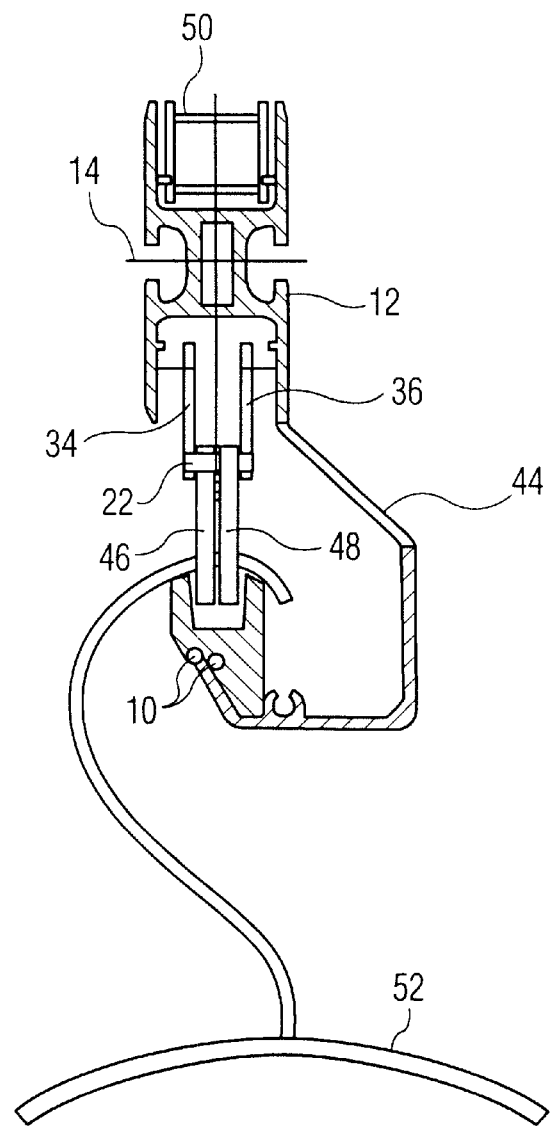
FIG. 2 is a cross section of FIG. 1.
Figure 3:
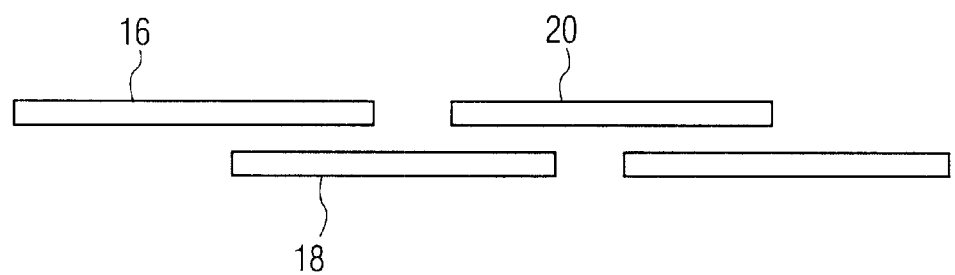
FIG. 3 is a top plan view showing the alternating arrangement of the drag catchers.

In FIGS. 1 and 3, three consecutive drag catches 16, 18, 20, are shown in a mutually overlapping position. The drag catches 16, 18, 20 are mounted pivotably at supporting blocks 28, 30, 32 on axes 22, 24, 26, which are horizontal, transverse or perpendicular to the plane of the drawing of FIG. 1. Moreover, the supporting blocks 28, 30, 32 comprise two lateral plates 34, 36 (FIG. 2), which lie on either side of the chain, which is not shown, and are fastened to it.

It can be seen from FIG. 1 that, in the position shown, the hooks of the drag catches 16, 18, 20 dip into the U-shaped profile of the rail 10, so that they can reliably take hold of a hook-shaped object, which is to be transported and is suspended from the U-shaped rail profile. Moreover, the drag catches have a curved lower cam surface before the hook so that, under certain conditions, they can be raised by the objects, which are being transported and are on the rails, and slide over these. In every case, the lowest position of the drag catches is shown in FIG. 1, since stops 38, 40, 42, which interact with a protrusion at the drag catches, which is directed to the right in FIG. 1, are provided at the supporting blocks 28, 30, 32.

It is ensured that the stop position of the drag catches 16, 18, 20 is always at the same height in relation to the rails 10, since the upper guiding mechanism 12 and the lower rail 10 are connected over a supporting profile 44.

It is evident from FIG. 1 that the drag catches 16, 18, 20 are disposed so as to overlap mutually and, in this way, are nested tightly. This enables objects to be transported in a very tight sequence and therefore with a high capacity. FIG. 2 shows how this overlapping is achieved. Two laterally offset, panel-shaped drag catches 46, 48, are shown here, which because of their narrow, panel-shaped dimensions, can dip next to one another into the U-shaped rail profile 10.

What is claimed is:

1. A drag catch conveyor comprising:
   an endless, driven pulling organ which can be moved along a specified path,
   a number of drag catches mounted to the pulling organ in mutually overlapping relation, and
   a rail system disposed below the path.

2. The drag catch conveyor of claim 1, wherein the drag catches are alternatively offset in a left direction and a right direction.

3. The drag catch conveyor of claim 1, wherein the pulling organ includes an endless chain.

4. The drag catch conveyor of claim 1, further comprising supporting blocks mounted to the pulling organ, and the drag catches are secured to the supporting blocks.

* * * * *